(12) United States Patent
Eshwar et al.

(10) Patent No.: US 9,529,830 B1
(45) Date of Patent: Dec. 27, 2016

(54) DATA MATCHING FOR COLUMN-ORIENTED DATA TABLES

(71) Applicant: International Business Machines Corporation, Armonk, NY (US)

(72) Inventors: Bhavani K. Eshwar, Bangalore (IN); Soma Shekar Naganna, Bangalore (IN); Umasuthan Ramakrishnan, Bangalore (IN); Shashidhar R. Yellareddy, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/008,764

(22) Filed: Jan. 28, 2016

(51) Int. Cl.
   *G06F 17/30* (2006.01)

(52) U.S. Cl.
   CPC ... *G06F 17/30303* (2013.01); *G06F 17/30675* (2013.01)

(58) Field of Classification Search
   None
   See application file for complete search history.

(56) References Cited

U.S. PATENT DOCUMENTS

| | | | |
|---|---|---|---|
| 8,713,434 B2 | 4/2014 | Ford et al. | |
| 8,972,336 B2 | 3/2015 | Jagota | |
| 2005/0240614 A1* | 10/2005 | Barsness | G06F 17/30536 |
| 2006/0136428 A1 | 6/2006 | Syeda-Mahmood | |
| 2008/0005106 A1* | 1/2008 | Schumacher | G06F 17/30489 |
| 2008/0244008 A1 | 10/2008 | Wilkinson et al. | |
| 2012/0317134 A1* | 12/2012 | Bourbonnais | G06F 17/30371 707/769 |
| 2013/0124960 A1* | 5/2013 | Velingkar | G06F 17/30286 715/220 |
| 2015/0309990 A1* | 10/2015 | Allen | G06F 17/2785 704/9 |

FOREIGN PATENT DOCUMENTS

| | | |
|---|---|---|
| WO | 2004013774 A2 | 2/2004 |
| WO | 2007143157 A3 | 12/2007 |

OTHER PUBLICATIONS

Bigelow et al., "Using Probabilistic Linkage to Merge Multiple Data Sources for Monitoring Population Health", Center for Health Systems Research & Analysis, University of Wisconsin—Madison, Jun. 1999, 22 pages.

* cited by examiner

*Primary Examiner* — Syed Hasan
(74) *Attorney, Agent, or Firm* — Steven F. McDaniel

(57) ABSTRACT

A computer-implemented method includes receiving a column-oriented table comprising data for a column family, wherein the data for the column family comprises column names and corresponding column values, receiving a set of anonymous column names for the column family, receiving a set of synonymous column names for the column family, determining a weighting for each column name that is not an anonymous column name based on the count or frequency of occurrence of the column name and the synonymous column names within the column-oriented table, and processing the column-oriented table with a probabilistic matching engine using the weighting for each column name. A corresponding computer program product and computer system are also disclosed herein.

20 Claims, 9 Drawing Sheets

| Row key | ColumnFamily:{ColumnQualifer:Version:Value} |
|---|---|
| 0001 | nameCF:{firstName:1:Soma Shekar,lastName:1:Naganna} ← 404/406 |
| 0002 | nameCF:{firstName:1:Umasuthan,lastName:1:Ramakrishnan } |
| 0003 | nameCF:{firstName:1:Bhavani,lastName:1:Eshwar,middleName:1:Kumar } |
| 0004 | nameCF:{firstName:1:Shashidhar,lastName:1:Yellareddy } |
| 0005 | nameCF:{fName:1:SomaShekar,lName:1:Naganna} |
| 0006 | nameCF:{FN:1:Bhavani,LN:1:Eshwar,MN:1:Kumar } |
| 0007 | nameCF:{fName:1:Umasuthan,lName:1:Ramakrishnan } |
| 0008 | nameCF:{ पहले नाम:1:भवानी, मध्य नाम :1: कुमार, अंतिम नाम:1:ईश्वर} |
| 0009 | nameCF:{ முதல் பெயர்:1: உமாசுத்தன், நடுப் பெயர் :1; ராமகிருஷ்ணன் } |
| 0010 | nameCF:{ Prénom:1: François, nom de famille:1: Sarkozy} |
| 0011 | nameCF:{FNM:1:Umasuthan,LNM:1:Ramakrishnan } |
| 0012 | nameCF:{firstName:1:Rajesh, lastName:1:Menon } |
| 0013 | nameCF:{firstName:1:Sreedevi,lastName:1:Varma} |
| 0014 | nameCF:{firstName:1:Shweta,lastName:1:Shandilya} |
| 0015 | nameCF:{firstName:1:Prabakar,lastName:1:Ramalingam} |

FIG. 4A

| Row key | ColumnFamily:{ColumnQualifer:Version:Value} |
|---|---|
| 0001 | nameCF:{firstName:1:Soma Shekar,lastName:1:Naganna} ← 404/406 |
| 0002 | nameCF:{firstName:1:Umasuthan,lastName:1:Ramakrishnan } |
| 0003 | nameCF:{firstName:1:Bhavani,lastName:1:Eshwar,middleName:1:Kumar } |
| 0004 | nameCF:{firstName:1:Shashidhar,lastName:1:Yellareddy } |
| 0005 | nameCF:{fName:1:SomaShekar,lName:1:Naganna} |
| 0006 | nameCF:{FN:1:Bhavani,LN:1:Eshwar,MN:1:Kumar } |
| 0007 | nameCF:{fName:1:Umasuthan,lName:1:Ramakrishnan } |
| 0008 | nameCF:{firstName:1:Bavani, lastName :1: Eshwar, middleName:1: Kumar} |
| 0009 | nameCF:{firstName:1: Umasudan, familyName:1: Ramakrishnan } |
| 0010 | nameCF:{firstname:1: Francois, familyName:1: Sarkozy} |
| 0011 | nameCF:{FNM:1:Umasuthan,LNM:1:Ramakrishnan } |
| 0012 | nameCF:{firstName:1:Rajesh, lastName:1:Menon } |
| 0013 | nameCF:{firstName:1:Sreedevi,lastName:1:Varma} |
| 0014 | nameCF:{firstName:1:Shweta,lastName:1:Shandilya} |
| 0015 | nameCF:{firstName:1:Prabaker,lastName:1:Ramalingam} |

| Column Qualifier | Synonyms | Definition (Dictionary assignment) |
|---|---|---|
| firstName | firstName, FName, fName | First Name |
| lastName | lastName, LName, lName, familyName | Last Name, Family Name |
| middleName | middleName, mName | Middle Name |

| Column Qualifier | N(R) | N(Q) | Qualifier Weight QW = N(Q)/N(R) | Extended Weight EW = SUM(QW) |
|---|---|---|---|---|
| firstName | 15 | 11 | 0.73 | 0.86 |
| lastName | 15 | 9 | 0.60 | 0.86 |
| middleName | 15 | 2 | 0.13 | 0.13 |
| FN | 15 | 1 | 0.07 | 0.00 |
| LN | 15 | 1 | 0.07 | 0.07 |
| MN | 15 | 1 | 0.07 | 0.07 |
| fName | 15 | 2 | 0.13 | 0.86 |
| lName | 15 | 2 | 0.13 | 0.86 |
| mName | 15 | 0 | 0 | 0.13 |
| FNM | 15 | 1 | 0.07 | 0.07 |
| LNM | 15 | 1 | 0.07 | 0.07 |
| familyName | 15 | 2 | 0.13 | 0.86 |

| Row key | ColumnFamily:{ColumnQualifer:Version:Value} |
|---|---|
| 0001 | nameCF:{firstName(EW=0.86):1:Soma Shekar,lastName(EW=0.86):1:Naganna} |
| 0002 | nameCF:{firstName(EW=0.86):1:Umasuthan,lastName(EW=0.86):1:Ramakrishnan } |
| 0003 | nameCF:{ firstName(EW=0.86):1:Bhavani,lastName(EW=0.86):1:Eshwar, middleName(EW=0.13):1:Kumar } |
| 0004 | nameCF:{ firstName(EW=0.86):1:Shashidhar,lastName(EW=0.86):1:Yellareddy } |
| 0005 | nameCF:{fName(EW=0.86):1:SomaShekar,lName(EW=0.86):1:Naganna} |
| 0006 | nameCF:{ FN(EW=0.07):1:Bhavani,LN(EW=0.07):1:Eshwar,MN(EW=0.07):1: Kumar } |
| 0007 | nameCF: :{ fName(EW=0.86):1:Umasuthan,lName(EW=0.86):1:Ramakrishnan } |
| 0008 | nameCF:{firstName(EW=0.86):1:Bavani, lastName(EW=0.86) :1: Eshwar, middleName(EW=0.13):1: Kumar} |
| 0009 | nameCF:{ firstName(EW=0.86):1: Umasudan, familyName(EW=0.86):1; Ramakrishnan } |
| 0010 | nameCF:{ firstName(EW=0.86):1: Francois, familyName(EW=0.86):1: Sarkozy} |
| 0011 | nameCF: :{ FNM(EW=0.07):1:Umasuthan,LNM(EW=0.07):1:Ramakrishnan } |
| 0012 | nameCF:{firstName(EW=0.86):1:Rajesh, lastName(EW=0.86):1:Menon } |
| 0013 | nameCF:{firstName(EW=0.86):1:Sreedevi,lastName(EW=0.86):1:Varma} |
| 0014 | nameCF:{firstName(EW=0.86):1:Shweta,lastName(EW=0.86):1:Shandilya} |
| 0015 | nameCF:{firstName(EW=0.86):1:Prabakar,lastName(EW=0.86):1:Ramalingam} |

FIG. 4E

| Row key | ColumnFamily:(ColumnQualifer:Version:Value) |
|---|---|
| E001 | enterpiseidentifier:{eid:1:10001,values:1:0001,0005 } |
| E002 | enterpiseidentifier:{eid:1:10002,values:1:0002,0007,0009} |
| E003 | enterpiseidentifier:{eid:1:10003,values:1:0003,0008 } |
| E004 | enterpiseidentifier:{eid:1:10004,values:1:0004 } |
| E005 | enterpiseidentifier:{eid:1:10005,values:1:0010} |
| E006 | enterpiseidentifier:{eid:1:10006,values:1:0006} |
| E007 | enterpiseidentifier:{eid:1:10007,values:1:0011} |
| E008 | enterpiseidentifier:{eid:1:10008,values:1:0012} |
| E009 | enterpiseidentifier:{eid:1:10009,values:1:0013} |
| E010 | enterpiseidentifier:{eid:1:10010,values:1:0014} |
| E011 | enterpiseidentifier:{eid:1:10011,values:1:0015} |

FIG. 4F

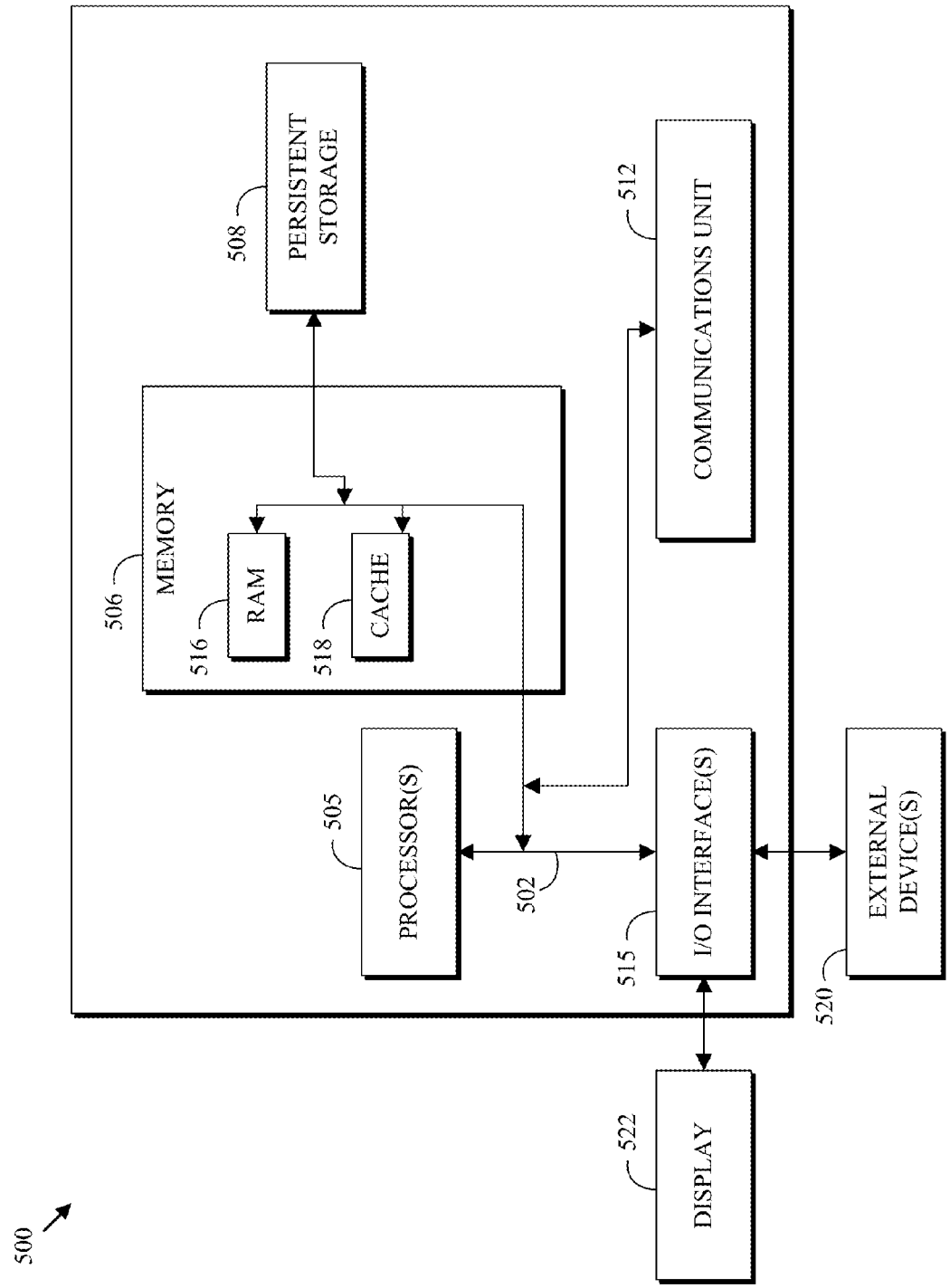

DATA MATCHING FOR COLUMN-ORIENTED DATA TABLES

BACKGROUND OF THE INVENTION

The present invention relates generally to processing data tables and more particularly to data matching for column-oriented data tables.

Column-oriented data tables such as those used in NoSQL databases are often used in distributed data processing environments to increase data processing throughput by assigning specific columns to specific servers and storage devices. Column-oriented data tables are also used for applications with unstructured or sparse data due to their flexible storage capabilities. Consequently, the processing demand for column-oriented data tables continues to increase.

Despite the advantages of column-oriented data tables, matching data in a probabilistic manner (e.g., using a probabilistic matching engine) is a challenge—particularly when sparse and/or unstructured data sources are involved.

SUMMARY

As disclosed herein, a computer-implemented method includes receiving a column-oriented table comprising data for a column family, wherein the data for the column family comprises column names and corresponding column values. The method also includes receiving a set of anonymous column names for the column family and receiving a set of synonymous column names for the column family. The method also includes determining a weighting for each column name that is not an anonymous column name based on the count or frequency of occurrence of the column name and the synonymous column names within the column-oriented table, and processing the column-oriented table with a probabilistic matching engine using the weighting for each column name. A corresponding computer program product and computer system are also disclosed herein.

BRIEF DESCRIPTION OF THE DRAWINGS

FIGS. 4A-4F are data tables depicting one example of data processed by the data matching method of FIG. 3 at various stages of processing; and FIG. 5 is a block diagram depicting one example of a computing apparatus (i.e., computer) suitable for executing the methods disclosed herein.

DETAILED DESCRIPTION

The embodiments disclosed herein recognize that matching column names in column-oriented tables is challenging and that using synonyms including user supplied synonyms may improve the quality of data matching and merging.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter.

Figure 1:
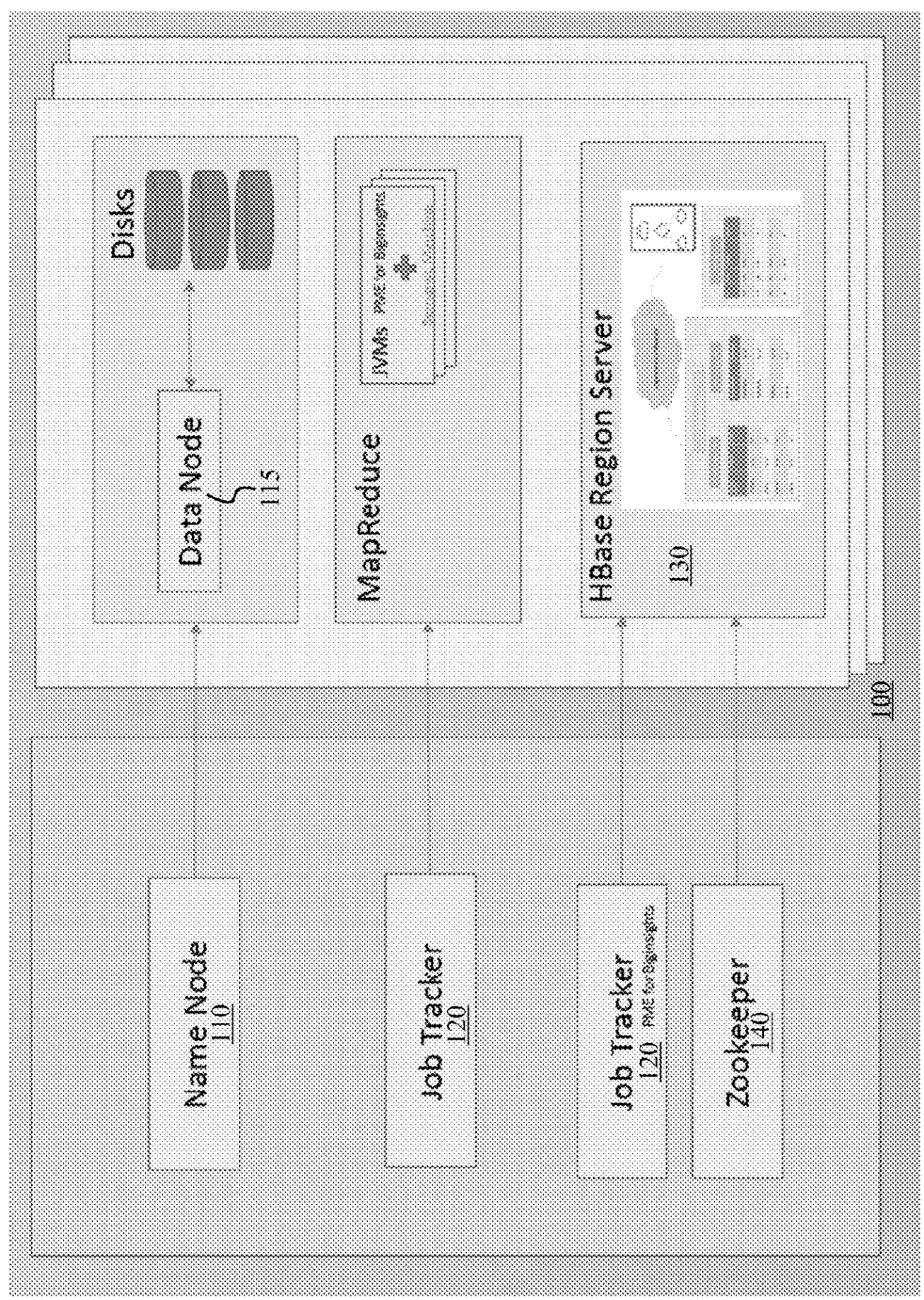
FIG. 1 is a block diagram depicting one example of a data processing environment in accordance with at least one embodiment of the present invention.

FIG. 1 is a block diagram depicting one example of a data processing environment 100 in accordance with at least one embodiment of the present invention. As depicted, the data processing environment 100 includes a namenode 110, one or more job trackers 120, region servers 130, and a zookeeper 140. The data processing environment 100 may be distributed across one or more clusters of servers.

The namenode 110 maintains a directory tree of a filesystem and tracks where data nodes 115 are stored within the data processing environment 100. Each data node 115 may include one or more files that may be replicated across multiple storage servers. In the depicted embodiment, the filesystem is a Hadoop Distributed File System (HDFS) and the namenode 110 references but does not store the data files.

The job trackers 120 assigns tasks such as MapReduce tasks to specific servers in the data processing environment 100. The region servers 130 store one or more column-oriented databases and may execute column-oriented operations on those tables. The zookeeper 140 configures, synchronizes and maintains other forms of coordination between the region servers 130.

Figure 2:
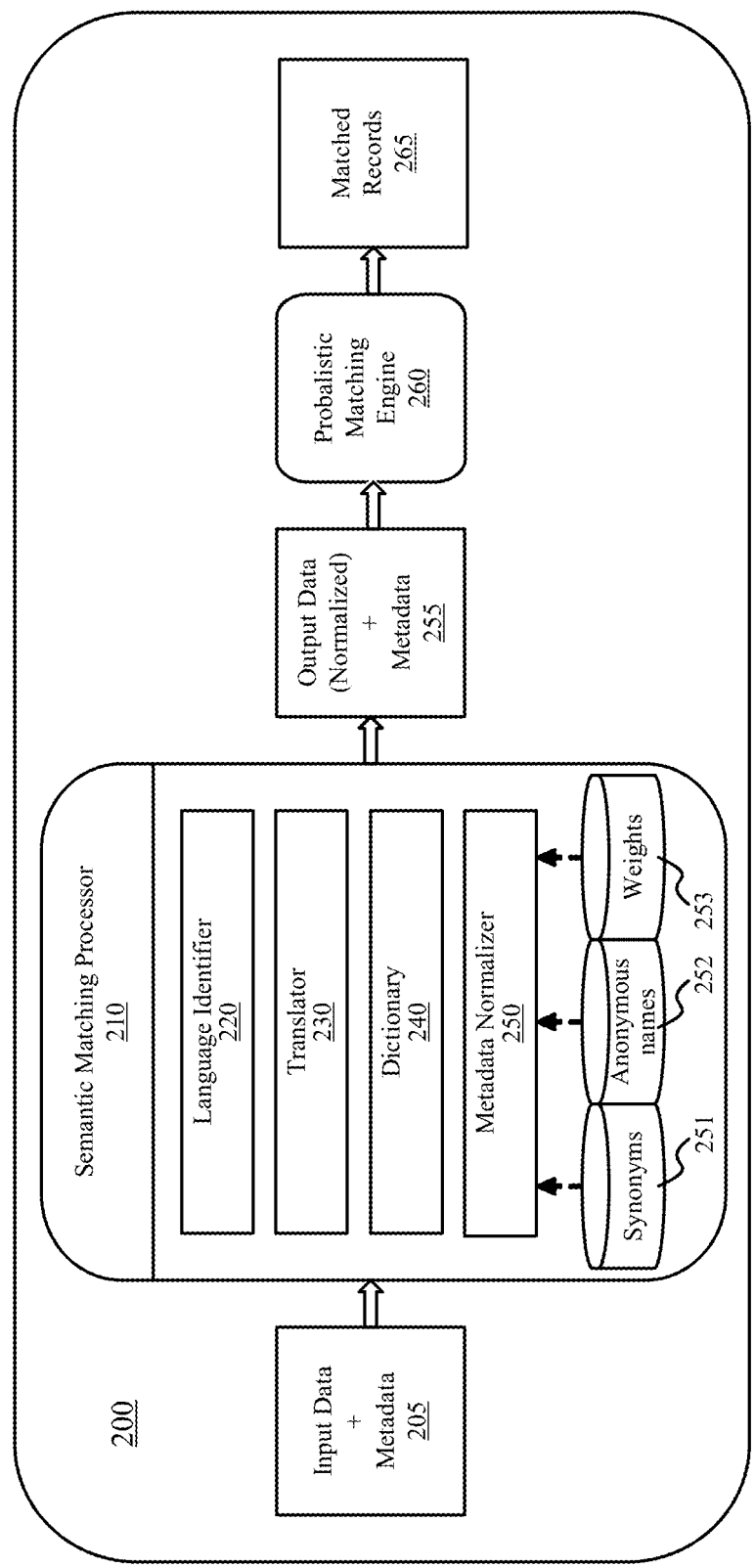
FIG. 2 is a block diagram depicting one example of a data matching system in accordance with at least one embodiment of the present invention.

FIG. 2 is a block diagram depicting one example of a data matching system 200 in accordance with at least one embodiment of the present invention. As depicted, the data matching system 200 includes a semantic matching processor 210 that includes a language identifier 220, a translator 230, a dictionary 240 and a metadata normalizer 250. The depicted data matching system 200 also includes a probabilistic matching engine 260. The data matching system 200 may be deployed as a set of tasks within the data processing environment 100.

The semantic matching processor 210 pre-preprocesses input data 205 and provides normalized data 255 to the probabilistic matching engine 260. In turn, the probabilistic matching engine 260 provides a listing of matched records 265. In some embodiments, semantic matching processor 210 assigns weights to column names which are used by the probabilistic matching engine 260.

The language identifier 220 identifies the language used for column names. The language may be automatically identified via dictionary lookup using the dictionary 240 or via a language identifier included in the metadata of data 205. For example, entries in the dictionary may associate a language identifier such as a language tag with the source language of the dictionary entry or via an optional language tag appended to a column name. Alternately, some other metadata may identify the source language of the metadata and/or data 205.

The translator 230 may translate metadata such as column names that are in a non-targeted language to the targeted language. For example, a column name of "familie naam/dutch" within a record may be translated to a selected target language such as English resulting in a translated column name of "family name" or "family name/english." In some embodiments, the translation is included in the dictionary 240 and the translator 230 retrieves the translated metadata from the dictionary 240. The dictionary 240 may include a preferred representation (e.g., a normalized column name) for each entry within the dictionary that is used by the metadata normalizer 250 to provide normalized metadata.

The metadata normalizer 250 may normalize and weight the metadata such as column names associated with the column-oriented table. The metadata normalizer may use synonyms 251 and anonymous names 252 along with frequency of occurrence information to generate weights for each column name. The synonyms 251 and anonymous names 252 may be provided by a user. In one embodiment, the synonyms 251 are extracted using name matching techniques and are confirmed or edited by the user.

The probabilistic matching engine 260 may use the normalized metadata 255 and generated weights 253 to provide the matched records 265.

Figure 3:
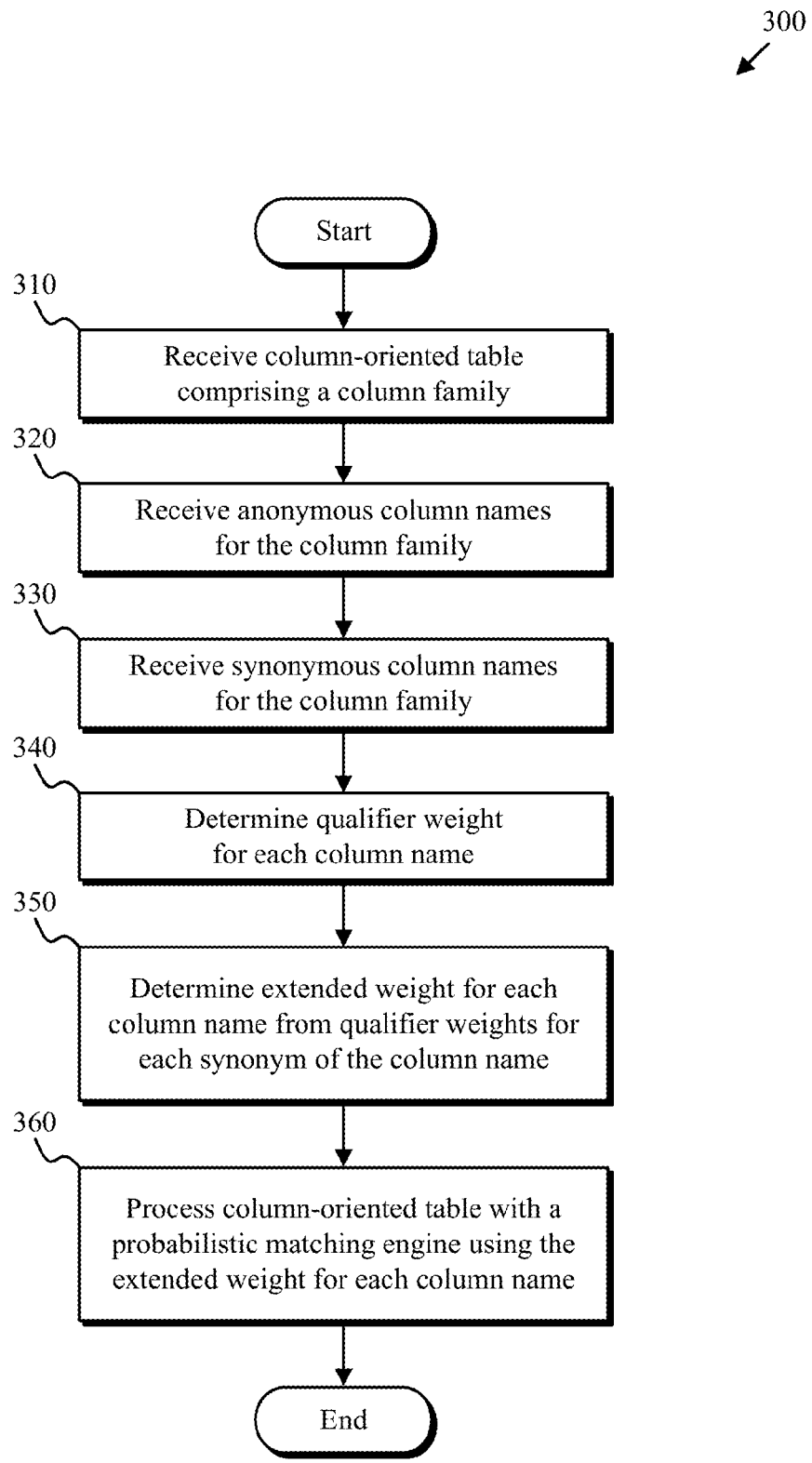
FIG. 3 is a flowchart depicting one example of a data matching method in accordance with at least one embodiment of the present invention.

FIG. 3 is a flowchart depicting one example of a data matching method 300 in accordance with at least one embodiment of the present invention. As depicted, the data matching method 300 includes receiving (310) a column-oriented table comprising a column family, receiving (320) anonymous column names for the column family, receiving (330) synonymous column names for the column family, determining (340) a qualifier weight for each column name, determining (350) an extended weight for each column name, and processing (360) the column-oriented table. The data matching method 300 may be conducted by the data matching system 200 or the like.

Receiving (310) a column-oriented table comprising a column family may include receiving a table where each row comprises one or more key/value pairs. The key of each key/value pair may indicate the column family while the value of each key/value pair may be a string that specifies the data for the column family. The string may contain one or more column names (i.e., qualifiers) and the data values associated therewith. Due to the flexibility of the column-oriented tables the table may be populated with sparse and/or unstructured data and spread across multiple servers. An example of a column-oriented table is shown in FIG. 4A.

Receiving (320) anonymous column names for the column family may include receiving a set of column names that are to be excluded from matching. The set may be specified in a list, a table, or some other structure. Receiving (330) synonymous column names for the column family may include receiving one or more sets of column names that are to be considered as synonymous (e.g., populated with similar data). The sets may be specified in a list, a table, a dictionary, or some other structure.

Determining (340) a qualifier weight for each column name may include computing a count or frequency of occurrence for each column name within the column-oriented table. For example, in one embodiment a rate of occurrence is computed by counting the occurrences of a column name within the table (i.e., the number of rows that reference the column name) and dividing that count by the number of rows in the table.

Determining (350) an extended weight for each column name may include summing the qualifier weights for each column name in a synonymous column name set and using the sum of the qualifier weights as an extended weight for each of the synonymous column names. The qualifier weights may be added to, or annotated within, the column oriented table to facilitate processing or loaded in memory for access during processing. Processing (360) the column-oriented table may include processing the column-oriented table with a probabilistic matching engine using the extended weight for each column name. In some embodiment, the extended column weights are computed for the entire table and placed in memory (in-place) and repetitively referenced while the column-oriented table is processed. In certain embodiments, the column-oriented table is processed on a per record basis.

FIGS. 4A-4F are data tables depicting one example of data processed by the data matching method of FIG. 3 at various stages of processing. FIG. 4A depicts an input data table 400 that includes various rows 402. The depicted input data table 400 is a column-oriented table with a single column family entry in each row 402 that is a key/value pair 404/406. The key 404 of the key/value pair specifies a column family name ("nameCF" in the depicted example) while a value 406 is a string that specifies various column names 408 and associated values 409. In the depicted example, the elements of the string (column name 408, version, and value 409) are separated from each other with a colon character ':'.

FIG. 4B depicts a translated data table 410 where the column names 408 and values 409 within the table 400 that are identified to be spelled in a non-targeted language (e.g., Hindu) are translated to the targeted language (e.g., English). In some embodiments, elements in a non-targeted language may be tagged with a language identifier to facilitate identification.

FIG. 4C depicts a synonyms table 420 where sets of synonyms 422 for various column names may be specified. A preferred column name 424 and one or more dictionary definitions 426 may also be specified for each set of synonyms. The synonyms 422 may be specified by a user or automatically generated and optionally approved or edited by a user.

FIG. 4D depicts a weighting table 430 where a qualifier weight 432 for each column name 408 found within the input data table 400 is based on an occurrence count 434. In the depicted embodiment, the qualifier weight 432 is an occurrence ratio that is computed by dividing the occurrence count 434 by a row count 436. An extended weight 438 may be computed from the qualifier weights 432 of each synonym (e.g., as defined by the synonyms table 420). In the depicted embodiment, the extended weight 438 is computed by summing the qualifiers 432 that correspond to the set of synonyms that a column name belongs to.

FIG. 4E depicts one example of a normalized data table 440. In the depicted embodiment, the normalized data table 440 is generated by annotating the translated data table 410 with the extended weights 438. The normalized data table 440 may be submitted to the probabilistic matching engine 260, or the like, to determine matching rows or records within a column-oriented data table.

FIG. 4F depicts one example of a matching records table 450. As depicted, the matching records table 450 includes rows 452 of matched record indicators 454 including a record key list 454. In many instances, the record key list 454 only references a single data record (or row). The matched records table 450 may be used to merge the records of the original input data table 400 and provide a merged record table (not shown).

FIG. 5 is a block diagram depicting one example of a computing apparatus (i.e., computer 500) suitable for executing the methods disclosed herein. It should be appreciated that FIG. 5 provides only an illustration of one embodiment and does not imply any limitations with regard to the environments in which different embodiments may be implemented. Many modifications to the depicted environment may be made.

As depicted, the computer 500 includes communications fabric 502, which provides communications between computer processor(s) 505, memory 506, persistent storage 508, communications unit 512, and input/output (I/O) interface(s) 515. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In the depicted embodiment, memory 506 includes random access memory (RAM) 516 and cache memory 518. In general, memory 506 can include any suitable volatile or non-volatile computer readable storage media.

One or more programs may be stored in persistent storage 508 for execution by one or more of the respective computer processors 505 via one or more memories of memory 506. The persistent storage 508 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 515 allows for input and output of data with other devices that may be connected to computer 500. For example, I/O interface 515 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 508 via I/O interface(s) 515. I/O interface(s) 515 may also connect to a display 522. Display 522 provides a mechanism to display data to a user and may be, for example, a computer monitor.

One of skill in the art will appreciate that the above disclosed embodiments may be adapted for a variety of environments and applications. Furthermore, the programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method, executed by one or more processors, the method comprising:
   receiving a column-oriented table comprising data for a column family, wherein the data for the column family comprises column names and corresponding column values;
   receiving a set of anonymous column names for the column family;
   receiving a set of synonymous column names for the column family;
   determining a weighting for each column name that is not an anonymous column name based on the count or frequency of occurrence of the column name and the synonymous column names within the column-oriented table; and
   processing the column-oriented table with a probabilistic matching engine using the weighting for each column name.

2. The method of claim 1, wherein a synonymous column name comprises a language tag.

3. The method of claim 2, further comprising translating the synonymous column name to a targeted language according to the language tag.

4. The method of claim 1, wherein the weighting for each column name corresponds to a sum of the count or frequency of occurrence of the column name and the count or frequency of occurrence of each synonym for the column name.

5. The method of claim 1, wherein the set of anonymous column names are provided by a user.

6. The method of claim 1, wherein the set of synonymous column names are provided by a user.

7. The method of claim 1, wherein the set of synonymous column names is automatically generated and confirmed or edited by a user.

8. The method of claim 1, wherein determining a weighting for each column name occurs in-place using memory used by the probabilistic matching engine.

9. The method of claim 1, wherein processing the column-oriented table comprises identifying matching rows.

10. The method of claim 1, wherein processing the column-oriented table comprises merging matching rows.

11. A computer program product comprising:
one or more computer readable storage media and program instructions stored on the one or more computer readable storage media, the program instructions comprising instructions executable by a computer to perform:
receiving a column-oriented table comprising data for a column family, wherein the data for the column family comprises column names and corresponding column values;
receiving a set of anonymous column names for the column family;
receiving a set of synonymous column names for the column family;
determining a weighting for each column name that is not an anonymous column name based on the count or frequency of occurrence of the column name and the synonymous column names within the column-oriented table; and
processing the column-oriented table with a probabilistic matching engine using the weighting for each column name.

12. The computer program product of claim 11, wherein a synonymous column name comprises a language tag.

13. The computer program product of claim 12, wherein the program instructions comprise instructions to translate the synonymous column name to a targeted language according to the language tag.

14. The computer program product of claim 11, wherein the weighting for each column name corresponds to a sum of the count or frequency of occurrence of the column name and the count or frequency of occurrence of each synonym for the column name.

15. The computer program product of claim 11, wherein the set of anonymous column names are provided by a user.

16. The computer program product of claim 11, wherein the set of synonymous column names are provided by a user.

17. The computer program product of claim 11, wherein the set of synonymous column names is automatically generated and confirmed or edited by a user.

18. The computer program product of claim 11, wherein determining a weighting for each column name occurs in-place using memory used by the probabilistic matching engine.

19. The computer program product of claim 11, wherein processing the column-oriented table comprises merging matching rows.

20. A computer system comprising:
one or more computers;
one or more computer readable storage media and program instructions stored on the one or more computer readable storage media for execution by at least one of the computers, the program instructions comprising instructions executable by a computer to perform:
receiving a column-oriented table comprising data for a column family, wherein the data for the column family comprises column names and corresponding column values;
receiving a set of anonymous column names for the column family;
receiving a set of synonymous column names for the column family;
determining a weighting for each column name that is not an anonymous column name based on the count or frequency of occurrence of the column name and the synonymous column names within the column-oriented table; and
processing the column-oriented table with a probabilistic matching engine using the weighting for each column name.

\* \* \* \* \*